United States Patent [19]

Wagner

[11] Patent Number: 4,643,075
[45] Date of Patent: Feb. 17, 1987

[54] VACUUM-OPERATED BRAKE POWER BOOSTER

[75] Inventor: Wilfried Wagner, Hattersheim, Fed. Rep. of Germany

[73] Assignee: ITT Industries, Inc., New York, N.Y.

[21] Appl. No.: 703,375

[22] Filed: Feb. 20, 1985

[30] Foreign Application Priority Data

Feb. 23, 1984 [DE] Fed. Rep. of Germany ....... 3406520

[51] Int. Cl.⁴ .............................................. F15B 9/10
[52] U.S. Cl. ................................ 91/369 A; 91/376 R
[58] Field of Search ............. 91/369 A, 369 C, 369 B, 91/369 R; 60/554; 403/220, 335

[56] References Cited

U.S. PATENT DOCUMENTS

| 3,172,334 | 3/1965 | Wuellner et al. | 91/369 A |
| 3,209,657 | 10/1965 | Randol | 91/369 B |
| 4,487,105 | 12/1984 | Harrison | 91/369 C |

FOREIGN PATENT DOCUMENTS 595696 12/1947 United Kingdom ................ 403/220
2074270 10/1981 United Kingdom ............. 91/369 A Primary Examiner—Robert E. Garrett
Assistant Examiner—Mark A. Williamson
Attorney, Agent, or Firm—James B. Raden; Donald J. Breh

[57] ABSTRACT

In a vacuum-operated brake power booster, a rubber reaction disc is arranged between a valve piston accommodated in the control housing and the push-rod coacting with the piston of the master cylinder. The disc features a substantially circular truncated cone-shaped configuration, and is retained in a recess of the control housing in such a manner that its smaller circular disc-shaped frontal area faces the valve piston. The recess in the control housing is partly configured as a cylindrical bore and is furnished at its control piston-side end with a funnel-shaped portion against which a truncated cone-shaped portion of the rubber reaction disc is abutted. Notwithstanding the utilization of a highly soft rubbery-elastic material, the partly truncated cone-shaped configuration of the rubber reaction disc renders possible a very short overall length of the control assembly.

4 Claims, 3 Drawing Figures

VACUUM-OPERATED BRAKE POWER BOOSTER

BACKGROUND OF THE INVENTION

The invention relates to a vacuum-operated brake power booster. A booster piston is sealed off relative to the booster housing, and a piston rod is coupled to a brake pedal and actuates a double valve. A power chamber of the brake power booster is connectable either to vacuum or to a higher differential pressure. The brake power booster includes a first valve formed by both a valve seat at the booster piston and a poppet valve preloaded in the direction of said valve seat. The booster also includes a second valve formed by both the same poppet valve and a valve piston connected to the piston rod. The booster piston forms a linkage with a control housing within which the valve piston is slidably supported. A rubber reaction disc is retained within the control housing. The rubber reaction disc is subject to the action of the control piston on one side and of a push-rod connected to the piston of the master cylinder on the other side. Known vacuum-operated brake power boosters have a rubber reaction disc interposed between the valve piston moved by the brake pedal via a piston rod and the pedal-side end of a push-rod co-acting with the piston of the master cylinder. The pressure building up in the master cylinder due to the primary cup when the compensating port has been bypassed brings a force of reaction to bear on the rubber reaction disc through the master cylinder piston and the push-rod. Such force of reaction is proportional to the force transmission ratio. The reaction pressure is transmitted to the valve piston, and as a result the piston is shifted and with its seat comes to be sealingly seated on the valve. The vacuum duct and the atmospheric air port are accordingly closed.

The different power-to-power pattern on actuation and release of a braking apparatus (output power at the push-rod divided by input power at the piston rod) is customarily called the hysteresis of a brake power booster. Such hysteresis is extraordinarily wide and is regarded as a disadvantage.

As has become evident from tests, the major share of the hysteresis is due to the reaction disc, that is to say, to the different shape changing efforts of the rubber material during forward and return run. Those apparatuses having a large-diameter and very soft reaction disc feature a distinctly narrower hysteresis than apparatuses with a small hard reaction disc. In braking apparatuses of more recent design, the design space for the control unit is, as a rule, very restricted, which is to the detriment of the size of the reaction disc. Although it is possible to increase the hardness of the reaction disc in order to maintain its wear in permanent operation within certain limits, this leads to a widening of the hysteresis.

The present invention has, therefore, an object to employ a relatively soft material as a reaction disc material without increasing, as a consequence, the rate of wear.

SUMMARY OF THE INVENTION

According to the invention, a rubber reaction disc is furnished with at least one portion whose bounding circular disc-shaped cross-sectional areas are sized differently. The envelope connecting said cross-sectional areas is dish shaped for example in the shape of the envelope of a spherical segment or else forming the envelope of a circular truncated cone.

In a preferred embodiment, the rubber reaction disc is provided with a first portion in the shape of a circular cylinder, which portion is succeeded by a second portion configured as a truncated cone, with the smaller frontal area of the second portion forming a circular disc and arranged to face the valve piston. In an alternative embodiment, the rubber reactioned disc has a first portion which is configured in the shape of a circular cylinder and is succeeded by a second portion shaped as a truncated cone, with the second portion being succeeded, in its turn, by a third portion having the shape of a circular cylinder.

Advantageously, the second truncated cone-shaped portion succeeding the first circular cylinder-shaped portion of the rubber reaction disc is furnished with a circular disc-shaped frontal area whose diameter corresponds to the diameter of the valve piston and/or of the disc arranged between the rubber reaction disc and the valve piston.

The recess positioned in the master cylinder-side end of the control housing is provided with a first cylindrical portion for the retaining and guidance of the rubber reaction disc. This portion is succeeded, in the direction of the piston rod, by a second, funnel-shaped portion. In order that the rubber reaction disc is permitted to expand as far as possible within the control housing in the direction toward the valve piston, the third cylindrical portion of the rubber reaction disc has a diameter which corresponds to that of the valve piston and/or of the disc.

DESCRIPTION OF THE PREFERRED EMBODIMENT

Figure 1:
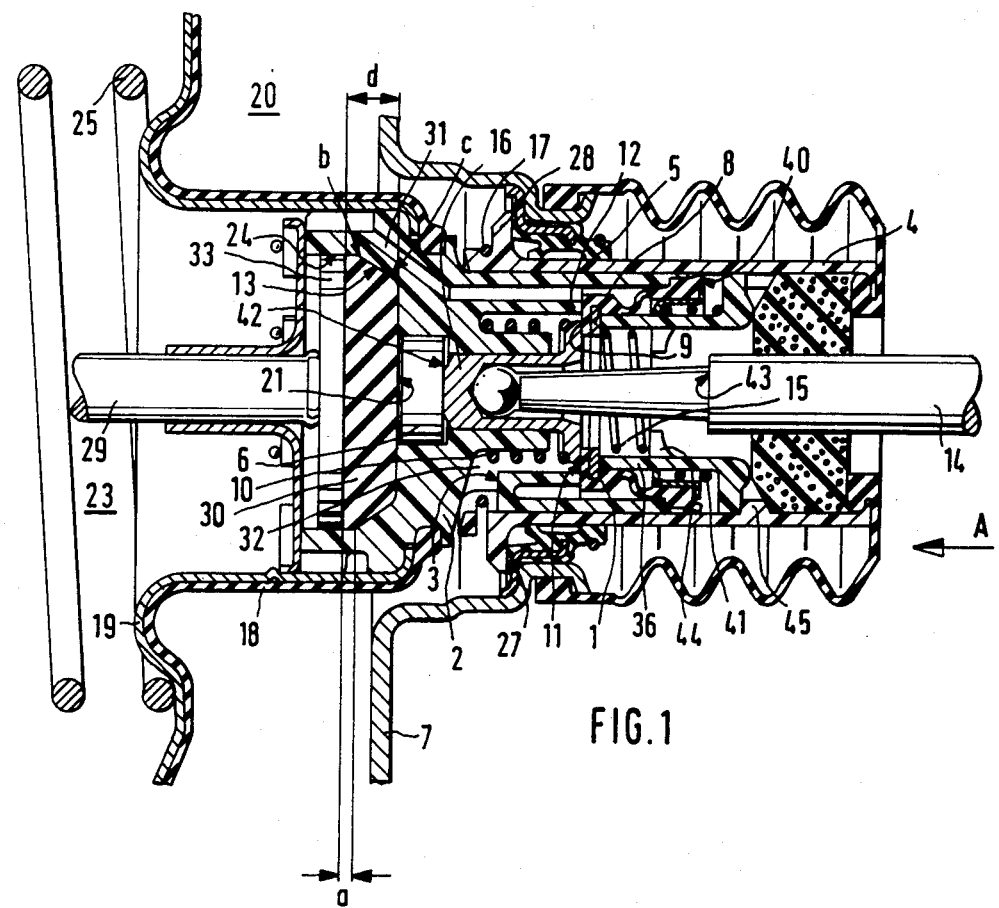
FIG. 1 is a longitudinal cross section through the control assembly of a brake power booster with two control housing parts being slidable relative to each other and with a disc interposed between the valve piston and the reaction disc.

As shown in FIG. 1, the brake power booster is comprised of booster housing 7, with rolling diaphragm 18 subdividing the interior space of housing 7 into chambers 20, 23. Diaphragm retainer 19 is adjacent diaphragm 18, and apparatus spring 25 abuts retainer 19. Two control housing parts 2, 4 are fit together with poppet valve 1 located therein.

An apparatus spring 25 urges diaphragm retainer 19 together with first control housing part 2 via sealing seat 12 against poppet valve 1. In effect this is against sealing face 11 and through second control housing part 4 against booster housing part 7. Apparatus spring 25 takes support at first control housing part 2 through diaphragm retainer 19.

On the side facing away from sealing face 11, poppet valve 1 has a stop 8 which is backed up against control housing part 4 through bushing 36 in the release position of the braking apparatus. Preferably, control housing part 4 is abutted against sealing ring 5 and so has a strictly defined rear end position. In this position, both sealing seat 9 at valve piston 16 and sealing seat 12 in control housing part 2 of two-part control housing 2, 4 are pressed against sealing face 11 of poppet valve 1. Owing to this configuration, valve piston sealing seat 9 can lift off immediately and the apparatus responds without lost travel on actuating piston rod 14.

When piston rod 14 is actuated, first control housing part 2 travels in a forward direction until stop 3 drags second control housing part 4. The sliding surface of sealing ring 5 is, therefore, designed correspondingly short. Control housing parts 2, 4 are sealed off relative to each other by means of sealing edge 40 of poppet valve 1.

Valve piston 16 is not rigidly coupled to disc 6 which serves to adjust the transmission ratio of the apparatus, since the opening travel of valve piston 16 is limited by stop 3. Owing to the fact that the two control housing parts 2, 4 are telescoped into each other, a large guide length is attained so that control housing parts 2, 4 are prevented from twisting out of each other or from jamming in to each other.

The two control housing parts 2, 4 perform a movement relative to each other, namely at the moment of response of the apparatus and when the apparatus has travelled back into its rear end position. During all other phases of functioning, the two control housing parts 2, 4 are at rest relative to each other.

Since in the release position of the braking apparatus, apparatus spring 25 and piston rod return spring 10 take support at poppet valve 1 through sealing face 11, sealing seats 9 and 12 are preferably configured in a manner that after a deformation of approximately 0.2 mm of the rubber, a comparatively large area comes to bearing in order to avoid a damage of the material. A lock washer 17 plugged on from the side takes care of limiting the travel of the two control housing parts 2, 4 relative to each other at stop 3.

In the release position of the braking apparatus, second control housing part 4 abuts through its collar 28 and stop 27 with sealing ring 5 which is pressed into booster housing part 7. Poppet valve 1 through stop 8 backs up within control housing part 4 by means of bushing 36. Sealing seat 9 of the valve piston 16 is pressed against sealing face 11 of poppet valve 1 by means of spring 10, with sealing seat 12 of control housing part 2 being pressed to sealing face 11 of poppet valve 1 through diaphragm retainer 19 by means of apparatus spring 25. In the position of the two control housing parts 2, 4 shown in the drawing, pressure balance is established in chambers 20, 23.

On actuation of the braking apparatus, piston rod 14 is caused to move in the direction of arrow A so that sealing seat 9 of valve piston 16 is lifted off from sealing face 11 of poppet valve 1 and atmospheric pressure enters chamber 20. Due to the pressure difference coming about between chambers 20 and 23, a force is established which urges first control housing part 2 in the direction toward the master cylinder (not shown in detail in the drawing). The force of reaction serving for the proportional control of the apparatus is transmitted to piston rod 14 through rubber reaction disc 30.

In the first phase of movement, control housing sealing seat 12 is sealed off by sealing face 11 of poppet valve 1 which travels dragged by control housing part 2, in that spring 15 takes support via control housing sealing seat 12 until sealing seats 12 and 9 enter into the so-called breathing position.

On actuation of the braking apparatus, control housing 4 initially remains at rest, until it is dragged by lock washer 17 through a stop 3. Spring 41 with the assistance of spring 15 then retains the two control housing parts 2, 4 in that position after the forementioned movement of the control housing parts 2, 4 relative to each other.

During release, the force is taken away at piston rod 14, as a result whereof spring 10 may push back valve piston 16 jointly with sealing seat 9 until control housing sealing seat 12 opens. The travel is limited by stop 3 of the two control housing parts 2, 4. The atmospheric pressure may now exit from chamber 20 through ducts 31, 32. Control housing sealing seat 12 will remain open until the apparatus has travelled all the way back and control housing part 4 is abutted with its collar 28 against stop 27 and control housing sealing seat 12 is being pushed back under the action of apparatus spring 25. During this operation, the two control housing parts 2, 4 will telescope into each other, and stop 3 will be disengaged so that the apparatus will then have assumed the release position.

At its end facing away from piston rod 14, valve piston 16 features a spherical segment-shaped frontal area 42 through which it is abutted against disc 6. As a result whereof clamping of disc 6 in its guide in control housing part 2 is avoided.

During assembly, piston rod 14 together with the bushing 36, poppet valve 1, valve piston 16, and springs 41 and 15 is inserted into the control housing part 2. Shoulder 43 takes support at the nose-like projection 44 extending radially inwardly from bushing 36, so that bushing 36 with poppet valve 1 and springs 41 and 15 can be pushed in by the force of piston rod 14. In the final phase of assembly, control housing part 4 is pushed onto control housing part 2, with the nose-like projections 45 provided at the control housing part 4 backing up at bushing 36 and maintaining springs 41 and 15 under preload. Finally, the two control housing parts 2, 4 are locked relative to each other with the aid of locking ring 17.

A particular advantage of poppet valve 1 is that it is supported and guided on the one side at the first control housing part 2 and that it is sealingly abutted on the other side against the cylindrical inside wall of the second control housing part 4 through an annular lip or sealing edge 40. The need for an additional sealing ring to seal off the two control housing parts 2, 4 against each other is eliminated.

In order to minimize the force exerted on the rear portion of the control housing part 4 due to the atmospheric pressure, the point of sealing of poppet valve 1 relative to the control housing part 4 is shifted greatly outwardly in radial direction, and sealing is made there by a sealing edge 40. Poppet valve 1 itself is sealingly seated at the first control housing part 2. Thanks to this arrangement, the atmospheric pressure force becomes very small and allows to be completely balanced by the spring 41.

In order to accommodate a push-rod 29 with a large diameter within the available space of the control assembly, there is provided a recess 24 of narrowing funnel-shape at one end. Recess 24 has a cylindrical portion that allows pressure disc 33 to move into the control housing 2. To increase the strength of control housing 4, control housing 4 and the reaction disc 30 feature sloped transition edges "b", "c" (between their cylindrical portions and their portions having a conical shape).

Reaction disc 30 is made of relatively soft rubber material.

Figure 2:
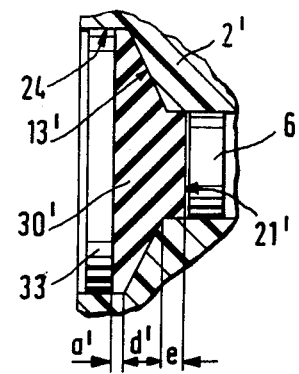
FIG. 2 is a cross section of a second embodiment of a rubber reaction disc according to the present invention.

As is evidenced by FIG. 1, rubber reaction disc 30 is furnished with a first portion "a" which has a cylindrical shape and with a second portion "d" which has the shape of a circular truncated cone. Said substantially conical-shape rubber reaction disc 30 is retained in recess 24. In the embodiment according to FIG. 2, the rubber reaction disc 30' is provided with a first cylindrical portion a', with a second truncated cone-shaped portion d' and with a third cylindrical portion "e", said third portion "e" having a diameter which corresponds to that of the disc 6 being interposed between the valve piston 16 and the rubber reaction disc 30', so that the third portion "e" penetrates into the bore of the disc 6.

Figure 3:
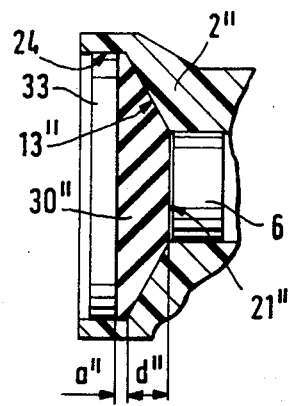
FIG. 3 is a cross section of a third embodiment of a rubber reaction disc according to the present invention.

Whereas in the embodiment of FIG. 1 the truncated cone-shaped portion "d" is sized in such a manner that frontal area 21 of rubber reaction disc 30 facing disc 6 is larger than the cross-sectional area of the bore in which disc 6 is accommodated, in the embodiment according to FIG. 3, frontal area 21" of rubber reaction disc 30" is sized to correspond to cross-sectional area of the bore for disc 6.

What is claimed is:

1. A vacuum-operated brake power booster for assisting the operation of a master cylinder comprising a booster piston sealed relative to a booster housing and a piston rod coupled to a brake pedal, said piston rod serving to actuate a double valve by means of which a power chamber is alternatively connectible either to vacuum or to a higher differential pressure, said double valve including a first valve formed by a valve seat at said booster piston and a poppet valve preloaded in the direction of said valve seat and a second valve formed by said poppet valve and a valve piston connected to said piston rod, said booster piston connected to a control housing within which said valve piston is slidably supported, and a rubber reaction disc retained within said control housing, said rubber disc being subject to the action of said valve piston on one side thereof and of a push-rod connected to a piston of the master cylinder on the other side, said rubber reaction disc including a first cylindrical portion defining a first uninterrupted planar circular disc-shaped area adjacent said push rod, a second portion extending from said cylindrical first portion configured as a truncated cone having an external surface tapering symmetrically, linearly from said first cylindrical portion defining a second uninterrupted planar circular disc-shaped area adjacent said valve piston less than said first area and at least equal to the area of said valve piston.

2. The vacuum-operated brake power booster of claim 1, wherein a master cylinder-side end of said control housing includes a recess, said recess having a cylindrical portion complementary to said first cylindrical portion of said rubber reaction disc and a funnel-shaped portion complementary to said truncated cone second portion of said rubber reaction disc.

3. The vacuum-operated brake power booster of claim 1, wherein said second area is greater than the area of said valve piston.

4. A vacuum-operated brake power booster for assisting the operation of a master cylinder comprising a booster piston sealed relative to a booster housing and a piston rod coupled to a brake pedal, said piston rod serving to actuate a double valve by means of which a power chamber is alternatively connectible either to vacuum or to a higher differential pressure, said double valve including a first valve formed by a valve seat at said booster piston and a poppet valve preloaded in the direction of said valve seat and a second valve formed by said poppet valve and a valve piston connected to said piston rod, said booster piston connected to a control housing within which said valve piston is slidably supported, and a rubber reaction disc retained within said control housing, said rubber reaction disc being subject to the action of said valve piston on one side thereof and of a push-rod connected to a piston of the master cylinder on the other side, said rubber reaction disc including a first cylindrical portion defining a first uninterrupted planar circular disc-shaped area adjacent said push rod, a second portion extending from said cylindrical first portion configured as a truncated cone having an external surface tapering symmetrically, linearly from said first cylindrical portion to a diameter equal to the diameter of said valve piston, and a third cylindrical portion extending from said second truncated cone portion having a diameter defining a second uninterrupted planar disc-shaped area adjacent said valve piston equal to the area of said valve piston.

* * * * *